United States Patent [19]

Mietzsch et al.

[11] 4,251,650
[45] Feb. 17, 1981

[54] PROCESS FOR THE POLYMERIZATION OF ETHYLENE IN THE PRESENCE OF SILYL ETHERS AS INITIATORS

[75] Inventors: Fritz Mietzsch, Cologne; Hans Rudolph, Krefeld; Heinrich Wolfers, Rheurdt; Heinrich Alberts, Cologne, all of Fed. Rep. of Germany

[73] Assignee: Bayer Aktiengesellschaft, Fed. Rep. of Germany

[21] Appl. No.: 75,729

[22] Filed: Sep. 14, 1979

Related U.S. Application Data

[63] Continuation-in-part of Ser. No. 971,388, Dec. 20, 1978, abandoned.

[30] Foreign Application Priority Data

Dec. 29, 1977 [DE] Fed. Rep. of Germany ....... 2758779

[51] Int. Cl.$^3$ .................... C08F 4/00; C08F 10/02
[52] U.S. Cl. .................... 526/194; 526/331; 526/352
[58] Field of Search .................... 526/194

[56] References Cited

U.S. PATENT DOCUMENTS

| 3,792,126 | 2/1974 | Vio | 526/194 |
| 3,931,355 | 1/1976 | Rudolph et al. | 526/194 |

*Primary Examiner*—Harry Wong, Jr.
*Attorney, Agent, or Firm*—Connolly and Hutz

[57] ABSTRACT

A process for the copolymerization of ethylene at pressures of from 200 to 3500 atms and temperatures of from 130° to 300° C., wherein silyl ethers are used as initiators.

4 Claims, No Drawings

PROCESS FOR THE POLYMERIZATION OF ETHYLENE IN THE PRESENCE OF SILYL ETHERS AS INITIATORS

This is a continuation-in-part application of my application Ser. No. 971,388, filed Dec. 20, 1978 and now abandoned.

This invention relates to a process for the polymerisation of ethylene in the presence of oligomeric pinacol silyl ethers as initiators.

Basically, ethylene can be polymerised by two different processes, both of which are worked on an industrial scale (cf. Vieweg, Schley, Schwarz in Kunststoff-Handbuch IV, Polyolefine, Hanser Verlag 1969, pages 39 et seq).

According to the so-called high pressure process, ethylene is polymerised at high temperature and under high pressure, for example at a temperature above 125° C. and under a pressure greater than 500 atms and, more particularly, at a temperature of from 140° C. to 300° C. and under a pressure of from 1000 to 3000 atms and higher. The polymerisation reaction is initiated by the addition of substances which form free radicals under these conditions. The initiators used are mainly oxygen, peroxides and azo compounds. This high pressure process gives a high quality polyethylene having a melting point of from only about 110° to 115° C. and a density of from 0.92 to 0.935 g/cc.

Highly crystalline, unbranched polyethylene having a density of from 0.95 to 0.96 g/cc is obtained by polymerising ethylene at a temperature below 100° C., preferably at a temperature in the range of from 50° to 80° C., and under low pressure, for example 10 atmospheres or even atmospheric pressure, in the presence of organometallic compounds which are known as Ziegler catalysts. "Ziegler catalyst" is the name given to a combination of a compound of a transition metal of Secondary Groups IVa to VIa of the Periodic System and an organometallic compound of a metal of Groups I to III of the Periodic System. One commonly used Ziegler catalyst system is based on a titanium compound, for example titanium tetrachloride or titanium trichloride, and an aluminium compound, for example aluminium triethyl or aluminium diethyl chloride. Since this kind of catalysts are easily decomposed by impurities, such as alcohols, amines or water, this process requires extremely clean apparatus and extremely pure ethylene as starting material.

British Pat. No. 828,828 describes a process for the polymerisation of olefins, particularly ethylene, at a temperature of at least 175° C. and under a pressure of at least 500 atms. The polyethylene thus produced has a density of up to 0.95 g/cc. The process, however, like the low pressure process, requires Ziegler catalysts.

According to investigations conducted by C. A. Mortimer and W. F. Hammer, as reported in J. Polym. Sci. A $\frac{2}{3}$, 1301 (1964), the degree of branching and density of high pressure polyethylene are largely unaffected by the type of radical former used and, for the most part, are only influenced by the ethylene pressure and the reaction temperature. Accordingly, the choice of suitable initiators is largely determined by economic aspects, with the result that it is preferred to use highly reactive initiators such as, peresters or percarbonates.

Initiators such as these, however, show a tendency towards spontaneous exothermic decomposition either when heated or where catalytically active impurities are present and, for this reason, necessitate elaborate safety measures.

Highly substituted ethane derivatives which, on heating, decompose into radicals by splitting their C-C-single bond have proved to be safe initiators for a number of radical polymerisation reactions. These radicals react immediately with the double bonds, as is the case, for example, with the initiators described in German Offenlegungsschrift Nos. 2,545,451=U.S. Pat. No. 4,036,898 and 2,444,252=U.S. Pat. No. 3,948,858 and in U.S. Pat. No. 3,896,099, or transfer hydrogen radicals to the monomers, as is the case, for example, with the pinacol derivatives described in German Auslegeschrift No. 1,216,877 and in the research report by D. Braun and K. H. Becker, Die Makromolekulare Chemie 147 (1971) 91.

These initiators, however, have never been successfully used for the polymerisation of ethylene possibly because they only decompose into radicals at high temperatures or because they are solid at room temperature and therefore difficult to process or because they are difficult to produce or because they show an inadequate polymerisation velocity.

It has now surprisingly been found that ethylene can be safely polymerised in high yields at a temperature of at least 100° C., preferably at a temperature in the range of from 130° to 300° C., under a pressure of more than 200 atms, preferably under a pressure of from 700 to 3000 atms, in the presence of oligomeric pinacol silyl ethers as initiators.

Accordingly, the present invention relates to a process for the homopolymerisation or copolymerisation of ethylene, optionally in the presence of a solvent, at a temperature of at least 100° C., preferably at a temperature in the range of from 130° to 300° C., and under a pressure of from 200 to 3,500 atms, preferably under a pressure of from 700 to 3000 atms, wherein as initiators silyl ethers corresponding to the following general formula are used:

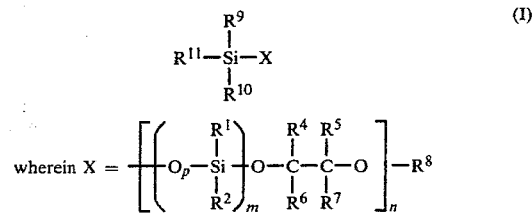

$R^1$ represents methyl, ethyl, phenyl, benzyl, or chloromethyl;

$R^2$ represents chlorine, hydroxyl, methoxy, ethoxy or $R^1$;

$R^4$ and $R^5$ the same or different represent aryl radicals optionally substituted by $C_1$-$C_4$-alkyl (preferably methyl), methoxy, chlorine or fluorine (preferably represent phenyl, tolyl, p-tert.-butyl phenyl, o and p-chlorophenyl, 2,4-dichlorophenyl, naphthyl, biphenylyl, or m-methoxy phenyl);

$R^6$ and $R^7$ the same or different either have the same meaning as $R^4$ and $R^5$ or represent $C_1$-$C_6$-alkyl radicals optionally substituted by $C_1$-$C_4$-alkyl (preferably methyl), methoxy, chlorine or fluorine (preferably represent methyl, ethyl, isopropyl), cycloalkyl radicals containing from 5 to 7 carbon atoms (preferably represent cyclohexyl) or hydrogen;

R[8] represents hydrogen or a silyl radical corresponding to the following general formula (II):

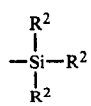

wherein
R[2] has the meaning given above
n is an integer of from 1 to 20
m is an integer of from 1 to 10
p is 0 or 1;
R[9] is R[1] or X
R[10] is R[2] or X and
R[11] is chlorine, hydroxyl or X.

The pinacol silyl ethers are generally obtained by reacting base metals, preferably metals of the first and second Main Groups of the Periodic System of the Elements by Mendelijeff, particularly lithium, sodium, potassium, magnesium or calcium, also aluminium, with α-aryl ketones or aryl aldehydes and di-, tri- or tetra-chloroorgano silanes, chlorinated poly-organo silanes or siloxanes in an inert solvent.

Suitable inert aprotic solvents for the preparation of the initiators are, for example aromatic and alkyl aromatic solvents such as benzene and toluene, ethers such as diethyl ether, diisopropyl ether, dibutyl ether, anisole, tetrahydrofuran, dioxane and 1,2-dimethoxy ethane, trialkyl phosphates, such as triethyl phosphate and tributyl phosphate and N,N-disubstituted amides, such as dimethyl formamide, N,N-dimethyl acetamide and phosphoric acid-tris-(dimethylamide). Other suitable solvents are described in Methoden der Organischen Chemie (Houben-Weyl), Vol. XIII/2a, pages 59–70, Georg. Thieme-Verlag, Stuttgart, 1973. Solvent mixtures of from (a) 0 to 80 parts by weight of benzene or toluene, from (b) 2 to 98 parts by weight of tetrahydrofuran and from (c) 0 to 98 parts by weight of triethyl phosphate or phosphoric acid-tris-(dimethylamide) have proved to be particularly suitable, the sum of (a)+(b)+(c) is always 100 parts by weight.

The pinacol silyl ethers have a molecular weight (numerical average) of from 500 to 12000 and preferably from 2000 to 8000.

The molecular weight of the silyl ethers used according to the present invention is determined by vapour pressure osmometry up to a molecular weight of 3000 and by membrane osmometry beyond a molecular weight of 3000, in each case using acetone as solvent. The molecular weights of individual fractions of the reaction mixtures according to the invention may be determined by gel chromatography (using standard substances).

Various reactants are mentioned in the following as examples for the starting materials, in order to prepare the initiators:

| | (A) | (B) | (C) |
|---|---|---|---|
| 1) | magnesium | benzaldehyde | trichloromethyl silane |
| 2) | magnesium | benzaldehyde | trichlorophenyl silane |
| 3) | magnesium | benzaldehyde | dichlorodimethyl silane |
| 4) | magnesium | acetophenone | trichloromethyl silane |
| 5) | sodium | acetophenone | diphenyl dichlorosilane |
| 6) | magnesium | propiophenone | trichloromethyl silane |
| 7) | lithium | isopropyl phenyl ketone | trichloromethyl silane |
| 8) | magnesium | cyclohexyl phenyl ketone | trichloromethyl silane |
| 9) | magnesium | benzophenone | trichloromethyl silane |
| 10) | magnesium | benzophenone | dichlorodimethyl silane |
| 11) | sodium | benzophenone | trichlorophenyl silane |
| 12) | lithium | 4,4-dimethyl benzophenone | trichloromethyl silane |
| 13) | potassium | benzophenone | dichlorodiphenyl silane |
| 14) | calcium | 4-t-butyl benzo phenone | trichloromethyl silane |
| 15) | magnesium | 4-chlorobenzo-phenone | trichloromethyl silane |
| 16) | sodium | 2-methyl benzo-phenone | dichlorodimethyl silane |
| 17) | magnesium | 2-chlorobenzo-phenone | trichloromethyl silane |
| 18) | magnesium | 2,4-dichlorobenzo-phenone | trichloroethyl silane |
| 19) | magnesium | 3-methoxy benzo-phenone | dichloroethoxy methyl silane |
| 20) | magnesium | naphthylphenyl ketone | trichloromethyl silane |
| 21) | magnesium | 4-phenyl benzo-phenone | trichloromethyl silane |
| 22) | magnesium | 4-benzoyl benzo-phenone | trichloromethyl silane |
| 23) | magnesium | benzaldehyde | tetrachlorosilane |
| 24) | aluminium | acetophenone | 1,2-dichlorotetra-methyl disilane |
| 25) | magnesium | acetophenone | tetrachlorosilane |
| 26) | aluminium | isopropyl phenyl ketone | $Cl_3-\underset{\underset{CH_3}{\mid}}{\overset{\overset{CH_3}{\mid}}{Si}}-\left(\underset{\underset{CH_3}{\mid}}{\overset{\overset{CH_3}{\mid}}{O-Si}}\right)_2-O-\underset{\underset{CH_3}{\mid}}{\overset{\overset{CH_3}{\mid}}{Si}}-Cl$ |
| 27) | magnesium | benzophenone | tetrachlorosilane |
| 28) | magnesium | benzophenone | 1,1,2-trichlorotri- |

-continued

| (A) | (B) | (C) |
|---|---|---|
| 29) aluminium | benzophenone | methyl disilane $CH_3-Si\left(-O-\underset{\underset{CH_3}{|}}{\overset{\overset{CH_3}{|}}{Si}}-O-\underset{\underset{CH_3}{|}}{\overset{\overset{CH_3}{|}}{Si}}-Cl\right)_3$ |
| 30) sodium | 2-chlorobenzophenone | $Cl-\underset{\underset{CH_3}{|}}{\overset{\overset{CH_3}{|}}{Si}}-\left(O-\underset{\underset{CH_3}{|}}{\overset{\overset{CH_3}{|}}{Si}}\right)_{5-6}-O-\underset{\underset{CH_3}{|}}{\overset{\overset{CH_3}{|}}{Si}}-Cl$ |
| 31) magnesium | 3-methoxybenzophenone | 1,2,3,4-tetrachlorohexamethylene tetrasilane |
| 32) lithium | 4-tert.-butyl benzophenone | $Si\left(-O-\underset{\underset{CH_3}{|}}{\overset{\overset{CH_3}{|}}{Si}}-O-\underset{\underset{CH_3}{|}}{\overset{\overset{CH_3}{|}}{Si}}-Cl\right)_4$ |

It has surprisingly been found that polyethylenes produced by the process according to the invention have a higher density, a lower degree of branching and a higher elongation at break than polyethylene peroxidically polymerised by the high pressure process under comparable conditions.

Accordingly, the polyethylenes produced in accordance with the invention may be used in areas where, hitherto, it has only been possible to use polyethylene produced under low pressure by the Ziegler process.

For carrying out the polymerisation reaction, a pinacol silyl ether is used in a quantity of from 0.001 to 10% by weight and preferably in a quantity of from 0.01 to 2.0% by weight, based on the quantity of monomers used. The pinacol silyl ethers may be used as such although they are preferably used in solution. Suitable solvents are lower aliphatic alcohols such as methanol, ethanol, isopropanol and tert.-butanol, carboxylic acid esters such as ethyl acetate, ethers such as diethyl ether, dibutyl ether, anisole, tetrahydrofuran, dioxane and 1,2-dimethoxy ethane, aromatic optionaly substituted with alkyl hydrocarbons such as benzene, toluene, or xylene, straight-chain or branched-chain paraffins such as petroleum ether and light petrol, cycloaliphatic solvents such as cyclohexane and decalin, dialkyl phosphates such as triethyl phosphate, N,N,di-substituted amides such as N,N-dimethyl acetamide and hexamethyl phosphoric triamide or solvent mixtures.

The process according to the invention may be carried out in batches or, preferably, continuously in stirrer-equipped vessels or tube reactors. On completion of the polymerisation reaction, the polymer formed in the reactor or reactors may be separated off from the unreacted ethylene and worked up by the usual methods. The unreacted ethylene is mixed with fresh ethylene and returned to the reactor.

The inventive process may be carried out in the presence or absence of solvents. Suitable known solvents for the polymerisation of ethylene are lower alcohols such as methanol, ethanol, and tert.-butanol, carboxylic acid esters such as ethyl acetate, aromatic hydrocarbons such as benzene, toluene, and xylene, or straight-chain or branched-chain paraffins such as petroleum ether, light petrol or other petroleum fractions, cycloaliphatic hydrocarbons solvents such as cyclohexane or mixtures of these solvents. Where the process is carried out in the presence of solvents, it is preferred to use hydrocarbons.

In order to reduce the molecular weight, and hence, to increase the melt index, the process according to the invention may also be carried out in the presence of chain transfer agents such as mercaptans. Since the molecular weight may also be controlled through the reaction conditions, preferably temperature and pressure, it is possible to vary the properties of the polyethylene over wide ranges.

The process according to the invention may also be used for the production of copolymers of ethylene with other $\alpha,\beta$ unsaturated monomers such as (meth)acrylic acid (meth)acrylic acid ester or vinyl acetate. Various additives such as antioxidants, UV-stabilisers, sulphur compounds, phosphorus compounds, dyes, pigments, fillers and antistatic agents or flameproofing agents, may be incorporated as required in the polyethylenes and copolymers produced in accordance with the invention in known amounts.

The ethylene homopolymers and copolymers produced by the process according to the invention may be processed by the known methods into films, preferably for the packaging sector, coatings, injection mouldings and extruded sheets, for example for deep drawing or for stamped mouldings.

EXAMPLE 1

A 1000 ml stirrer-equipped autoclave comprising a 20 ml metering attachment with a shutoff valve was filled with 200 ml of cyclohexane. 200 mg of the oligomeric benzpinacol silyl ether, produced by reacting benzophenone with magnesium and trichloromethyl silane and having a molecular weight $M_n$ of 1400 (numerical average $M_n$ as determined by osmometry), were introduced into the metering attachment in the form of a solution in 10 ml of cyclohexane. All the air present in the reactor was then carefully removed by repeated evacuation and purging with ethylene. Highly pure ethylene was introduced at room temperature up to a pressure of 400 bars. The temperature was then increased to 130° C. and the internal pressure to 1000 bars by the introduction under pressure of more ethylene. After the equilibrium state had been reached, the contents of the metering attachment were introduced under pressure with ethylene into the autoclave. The reaction began immediately, as reflected in a rapid drop in the internal pressure of the reactor. An excessive drop in pressure was however, prevented by the introduction of more ethylene. After a reaction time of 60 minutes, the reactor was cooled, vented and opened in order to remove the polyethylene produced which was in the form of a powder. The polymer thus obtained was dried in vacuo at 50° C. to constant weight. 176 g of polymer having an intrinsic viscosity $[\eta]$ of 0.52 dl/g, as measured in tetralin at 120° C. *, were obtained. The polymer had a density of 0.942 g/ml.

*) W. Hoffmann, H. Krömer and R. Kuhn in "Polymeranalytik 1", Georg Thieme Verlag, Stuttgart 1977.

EXAMPLE 2

The procedure was repeated as described in EXAMPLE 1, except that the initiator used was an oligomeric acetophenone pinacol silyl ether, produced by reacting acetophenone with magnesium and trichloromethyl silane and having a molecular weight (numerical average $M_n$) of 1100, and the polymerisation reaction was carried out at 180° C. 189 g of polyethylene having an intrinsic viscosity $[\eta]$ of 0.3 dl/g measured is defined in example 1 and a density of 0.938 g/ml were obtained.

EXAMPLE 3

A 150 ml high pressure reactor for the continuous polymerisation of ethylene, equipped with an effective stirrer, was charged with 520 g/hour of ethylene. Immediately in front of the reactor inlet, 470 mg/h of the initiator used in Example 1, in the form of a 20% solution in cyclohexane, was introduced into the stream of ethylene. By using an external heat supply and by adjusting the pressure retaining valve at the reactor outlet, an internal temperature of 182° C. and an internal pressure of 1780 bars were adjusted. 58 g/h of polymer were removed from the venting receiver. The polymer had an intrinsic viscosity $[\eta]$ of 0.78 dl/g measured as defined in example 1 and a density of 0.939 g/ml.

EXAMPLE 4

380 g/h of ethylene and 40 g/h of vinyl acetate were passed through the reactor described in Example 3 under the same condition as described in Example 3. 47 g/h of a copolymer containing 9.8% by weight of vinyl acetate units were obtained. The polymer had an intrinsic viscosity $[\eta]$ of 0.69 dl/g measured as defined in example 1 and a density of 0.948 g/ml.

We claim:

1. A process for the production of homopolymers or copolymers of ethylene by radical polymerisation at a temperature of at least 100° C. and under a pressure of from 200 to 3500 atms, optionally in the presence of a solvent, wherein as the initiators a silyl ether corresponding to the general formula I is used:

$$R^{11}-\underset{\underset{R^{10}}{|}}{\overset{\overset{R^9}{|}}{Si}}-X \qquad (I)$$

wherein X =

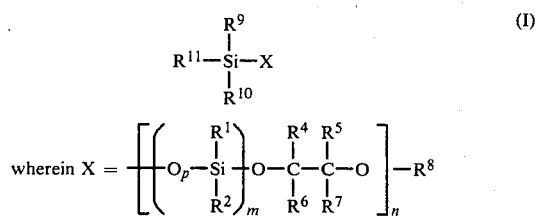

$R^1$ represents methyl, ethyl, phenyl, benzyl or chloromethyl;

$R^2$ represents chlorine, hydroxyl, methoxy, ethoxy or $R^1$;

$R^4$ and $R^5$ the same or different represent aryl radicals optionally substituted by $C_1$–$C_4$-alkyl, methoxy, chlorine, or fluorine;

$R^6$ and $R^7$ the same or different either have the same meaning as $R^4$ and $R^5$ or represent $C_1$–$C_6$-alkyl radicals optionally substituted by $C_1$–$C_4$-alkyl, methoxy, chlorine or fluorine, cycloalkyl radicals containing from 5 to 7 carbon atoms or hydrogen;

$R^8$ represents hydrogen or a silyl radical corresponding to the general formula II:

wherein $R^2$ has the meaning given above; and n is an integer of from 1 to 20, m is an integer from 1 to 10, is 0 or 1;

$R^9$ represents $R^1$ or X $R^{10}$ represents $R^2$ or X and $R^{11}$ represents chlorine, hydroxyl or X.

2. A process as claimed in claim 1, wherein the silyl ether has a molecular weight $M_n$ of from 2000 to 8000.

3. A process as claimed in claim 1, wherein $R^4$ and $R^5$ represent phenyl, tolyl, p-tert.-butyl phenyl, o and p-chlorophenyl, 2,4-dichlorophenyl, naphthyl, biphenylyl, or m-methoxy phenyl; and $R^6$ and $R^7$ represent $R^4$ or $R^5$ as claimed herein or methyl, ethyl, isopropyl or cyclohexyl.

4. A process as claimed in claim 1, wherein the silyl ether is the reaction product of the following compounds (B) and (C) in the presence of a metal (A):

|  | (A) | (B) | (C) |
|---|---|---|---|
| 1) | magnesium | benzaldehyde | trichloromethyl silane |
| 2) | magnesium | benzaldehyde | trichlorophenyl silane |
| 3) | magnesium | benzaldehyde | dichlorodimethyl silane |
| 4) | magnesium | acetophenone | trichloromethyl silane |
| 5) | sodium | acetophenone | diphenyl dichlorosilane |
| 6) | magnesium | propiophenone | trichloromethyl silane |
| 7) | lithium | isopropyl phenyl ketone | trichloromethyl silane |
| 8) | magnesium | cyclohexyl phenyl ketone | trichloromethyl silane |
| 9) | magnesium | benzophenone | trichloromethyl silane |
| 10) | magnesium | benzophenone | dichlorodimethyl silane |
| 11) | sodium | benzophenone | trichlorophenyl silane |
| 12) | lithium | 4,4-dimethyl benzophenone | trichloromethyl silane |
| 13) | potassium | benzophenone | dichlorodiphenyl silane |
| 14) | calcium | 4-t-butyl benzophenone | trichloromethyl silane |
| 15) | magnesium | 4-chlorobenzophenone | trichloromethyl silane |
| 16) | sodium | 2-methyl benzophenone | dichlorodimethyl silane |
| 17) | magnesium | 2-chlorobenzophenone | trichloromethyl silane |
| 18) | magnesium | 2,4-dichlorobenzophenone | trichloroethyl silane |
| 19) | magnesium | 3-methoxy benzophenone | dichloroethoxy methyl silane |
| 20) | magnesium | naphthylphenyl ketone | trichloromethyl silane |
| 21) | magnesium | 4-phenyl benzophenone | trichloromethyl silane |
| 22) | magnesium | 4-benzoyl benzophenone | trichloromethyl silane |
| 23) | magnesium | benzaldehyde | tetrachlorosilane |

* * * * *